United States Patent [19]
Elmore et al.

[11] 3,863,742
[45] Feb. 4, 1975

[54] RETAINER FOR OVERRUNNING CLUTCH

[75] Inventors: J. Russell Elmore, New Hartford; Gerard William Gehrke, Litchfield, both of Conn.

[73] Assignee: The Torrington Company, Torrington, Conn.

[22] Filed: Aug. 8, 1973

[21] Appl. No.: 386,612

[52] U.S. Cl. .............................................. 192/45
[51] Int. Cl. ...................... F16d 15/00, F16d 41/06
[58] Field of Search ................... 192/45; 188/82.84; 308/217

[56] References Cited
UNITED STATES PATENTS

| | | |
|---|---|---|
| 3,184,020 | 5/1965 | Benson et al. ........................ 192/45 |
| 3,241,641 | 3/1966 | Cowles ................................. 192/45 |
| 3,260,333 | 7/1966 | Benson et al. ........................ 192/45 |
| 3,339,687 | 9/1967 | Cowles ................................. 192/45 |
| 3,404,760 | 10/1968 | Benson et al. ........................ 192/45 |
| 3,438,685 | 4/1969 | Teufel .................................. 308/217 |
| 3,537,554 | 11/1970 | Elmore ................................ 192/45 |
| 3,537,555 | 11/1970 | Reister et al. ........................ 192/45 |

Primary Examiner—Allan D. Herrmann
Attorney, Agent, or Firm—Frank S. Troidl

[57] ABSTRACT

This retainer for an overrunning clutch comprises one or more resilient spring bars interconnecting longitudinally spaced rims. The spring bars operate to retain the rolling members in the retainer and to exert a spring bias against the rolling members in the clutch assembly.

19 Claims, 22 Drawing Figures

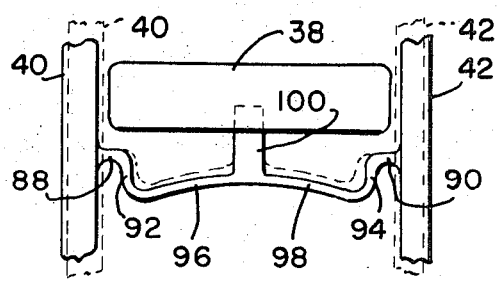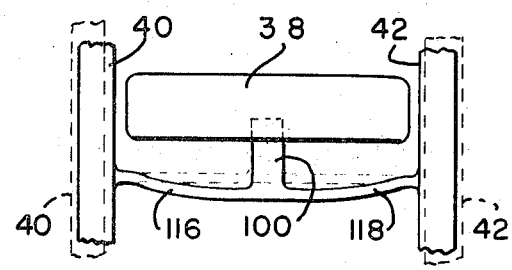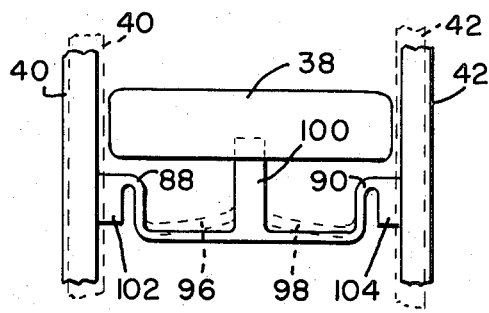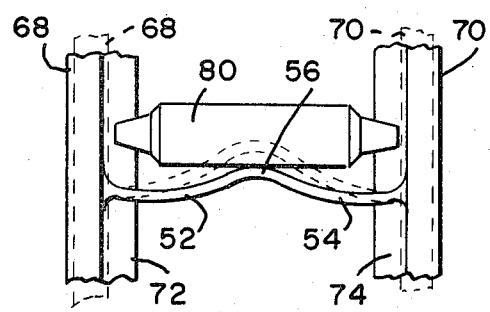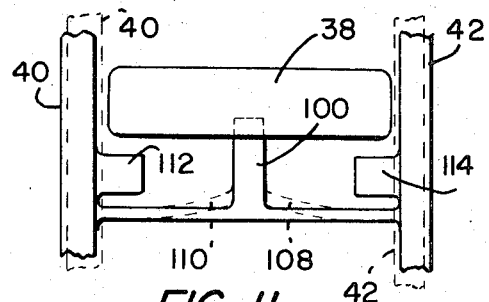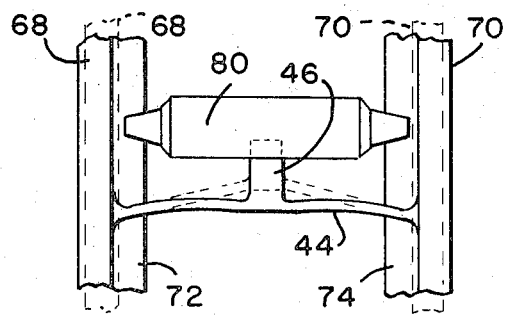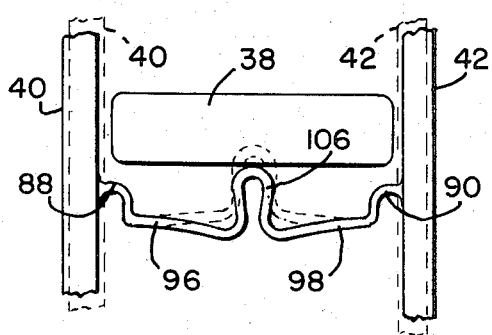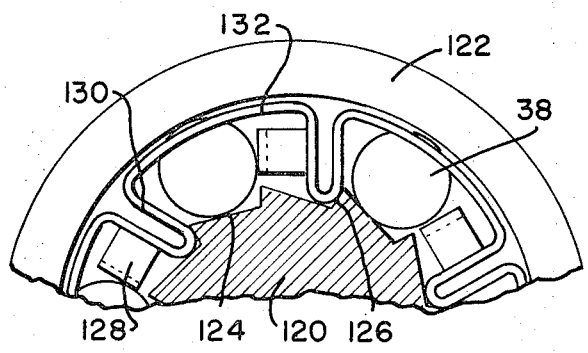

PATENTED FEB 4 1975 3,863,742

RETAINER FOR OVERRUNNING CLUTCH

This invention relates to overrunning roller clutches. More particularly, this invention is a new and improved retainer for overrunning roller clutches.

Retainers for rolling members in a clutch are known. Known retainers include a relatively rigid crossbar interconnecting the rims of the retainer and a spring attached to the crossbar or to the end rim or integral therewith. The springs flex when the rollers are placed in the retainer to exert a spring bias against the rollers. The spring bias urges the rollers circumferentially against cam surfaces of the overrunning clutch. In known retainers, the crossbar itself does not flex.

The use of springs separate from the crossbar creates unnecessary manufacturing problems and expense. Our invention simplifies the manufacture of the retainer and provides other advantages.

Briefly, our invention is a retainer for an overrunning clutch which comprises one or more resilient spring bar members directly interconnecting a pair of longitudinally spaced rims. The spring bar members are the only member interconnecting the rims. There is no separate crossbar. Each spring bar member functions as a crossbar for interconnecting the end rims for properly positioning the inserted rolling members and as a rolling member biasing member.

The manufacture of the retainer is simplified by eliminating the separate springs. The spring crossbar is much more rugged and less liable to be damaged in manufacture, handling, and service than is the spring of a comparable one piece clutch cage such as shown by U.S. Pat. No. 3,184,020 and U.S. Pat. No. 3,339,687. One spring bar can operate one, or several rollers, as required by the overrunning clutch structure.

The invention, as well as its many advantages, may be further understood by reference to the following detailed description and drawings in which.

Figure 17:
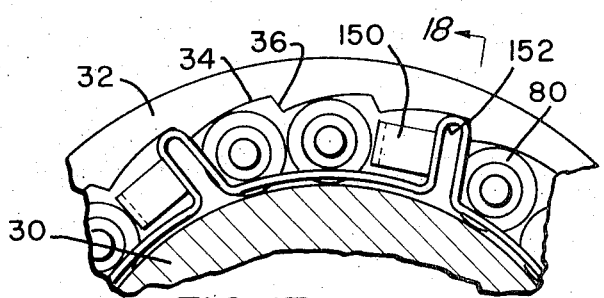
Figure 18:
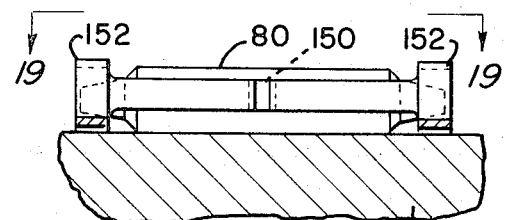
Figure 20:
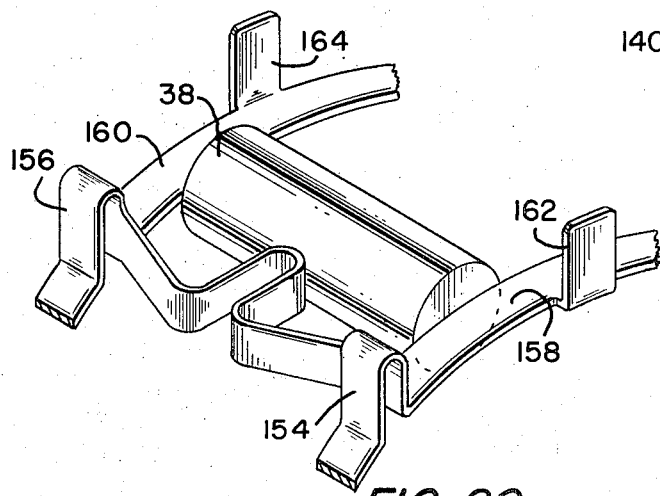
Figure 19:
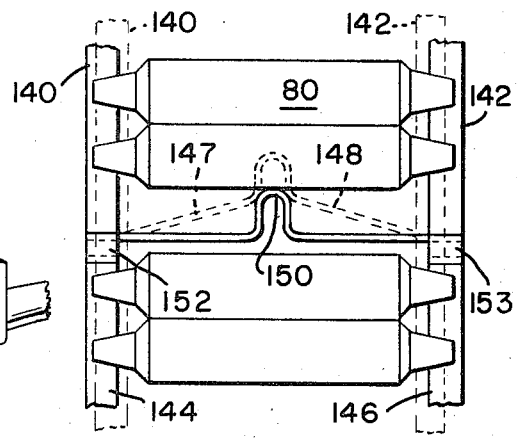
Figure 21:
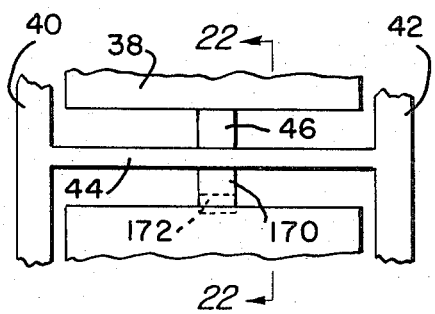
Figure 22:
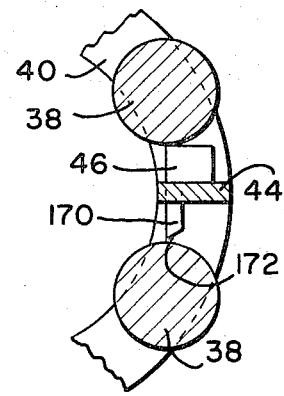

FIG. 9 through FIG. 15 each show further modifications of our invention;

FIG. 16 is a fragmentary front view, partly in section, showing the use of our new retainer in an overrunning clutch with the cam surface on the inner shaft member and a retainer made from sheet metal strip;

FIG. 17 is a fragmentary front view, partly in section of an overrunning clutch with the cam surface on the outer member and a retainer made of sheet metal strip;

FIG. 18 is a sectional view taken along lines 18—18 of FIG. 17 with the outer case removed;

FIG. 19 is a view taken along lines 19—19 of FIG. 18;

FIG. 20 is a fragmentary view of still another modification of our invention;

FIG. 21 is a fragmentary view of still another modification of our invention; and FIG. 22 is a view taken along lines 22—22 of FIG. 21 and along the direction of the arrows.

In general, throughout this detailed description, like parts in the various figures will be referred to by like numbers.

Figure 1:
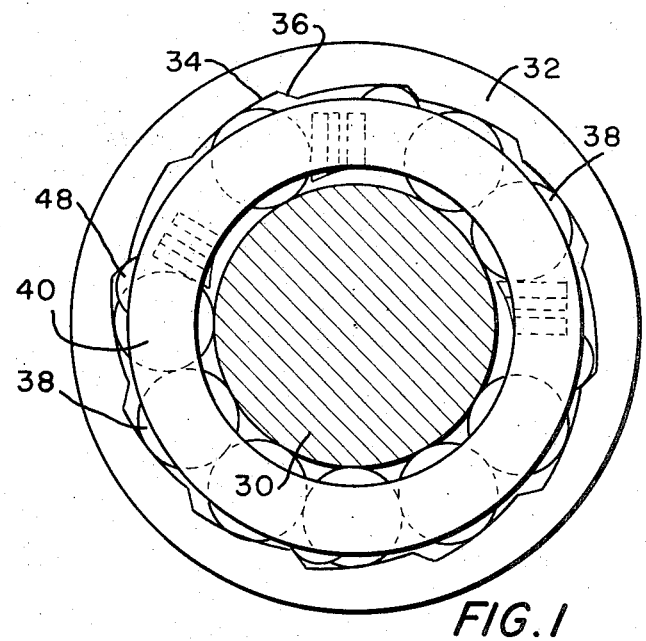
FIG. 1 is a front view, partly in section, showing our novel retainer in an overrunning clutch with spring bars biasing one, two, and several rollers.

Referring to the drawings and more particularly, to FIG. 1 the overrunning clutch includes a rotatable shaft or inner race 30 and an outer case 32 of greater inside diameter than the diameter of the shaft or race 30, thus providing space between the two members. The inside perimeter of the outer case is provided with one or more cam surfaces including ramps 34 and stops 36.

Relative rotation of shaft or race 30 and outer case 32 in one direction tends to wedge the rollers 38 into decreasing space between the shaft and the cam ramps 34 causing the clutch to lockup and the shaft and the case to rotate as a unit. Relative rotation of the shaft and the case in the opposite direction tends to move the rollers toward the increasing space to adjacent stops 36 causing the rollers to be loose and allowing relative rotation of the shaft and the outer case to take place freely. This is known as overrunning.

Figure 2:
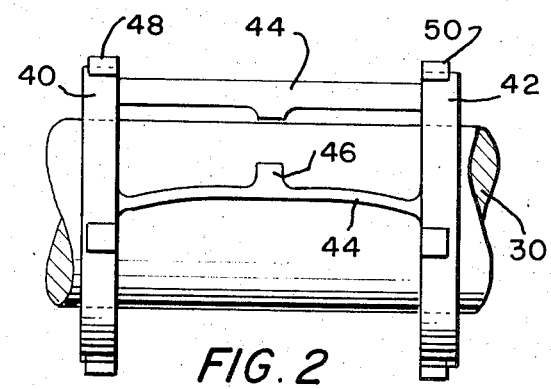
FIG. 2 is a side view of a retainer on a shaft or inner race with the outer case and rollers removed.
Figure 3:
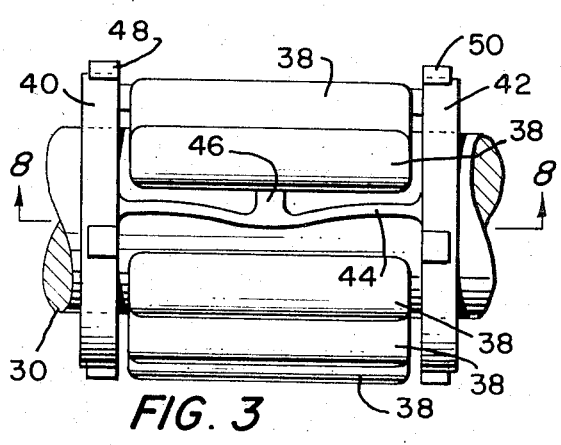
FIG. 3 is a view similar to FIG. 2 with the rollers inserted in the retainer in the positions the rollers would occupy in the overrunning clutch outer case with shaft or inner race installed therethrough.

Referring to FIGS. 1, 2, and 3, our new retainer has a pair of longitudinally spaced rims 40 and 42. Resilient spring bar members 44 directly interconnect the rims. Though a single spring bar member may be used in our new retainer, for most purposes two or more spring bar members will be used.

The spring bar 44 includes a portion 46 adapted to be engaged by a rolling member 38 (see FIG. 3) when the rolling member is placed in the retainer and assembled to the outer case and shaft. The inserted rolling member flexes the spring member 44 circumferentially when the shaft or inner race is inserted thereby causing a spring bias to be exerted against the rolling members. In the embodiment shown in FIG. 2 and FIG. 3, the portion contacting the rolling member is shown as a protrusion having a substantially rectangular cross section and extending circumferentially outwardly from the resilient member 44 (see FIG. 2). If desired, the protrusion can be any efficient projecting form such as a triangle, a semi-oval, or a half-round.

The end rims 40 and 42 will move axially toward or away from each other according to the spring bar structure as the shaft is installed in the clutch assembly. This axial movement of the end rims is caused by the circumferential flexing of the spring bar 44 and a slight space must be allowed in the assembly for this motion.

The retainer spring bars 44 continuously, resiliently urge the rollers 38 toward the lockup position of decreasing space between the shaft 30 and the outer case 32 so that when relative rotation changes from overrunning direction to lockup direction, each roller is almost immediately in intimate lockup.

A plurality of circumferentially spaced tabs 48 and 50 are located on the outer circumference of rims 40 and 42, respectively. Tabs 48 and 50 engage the stops 36 on the outer case 32 to prevent unwanted circumferential movement of the retainer. Some applications will require only one tab.

Figure 4:
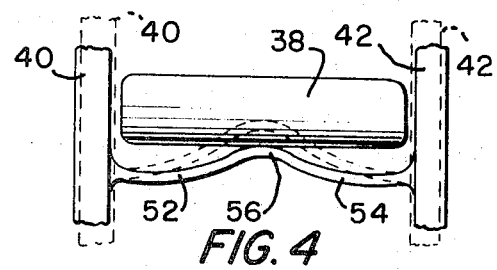
FIG. 4 is a fragmentary view of a modification of our retainer.

In the embodiment shown in FIG. 4, the spring bar comprises a concavely curved portion 52 extending axially inwardly from end rim 40 and circumferentially forwardly from rim 40 and a concavely formed portion 54 extending axially inwardly from end rim 42 and circumferentially forwardly from rim 42. These concave curved portions are interconnected by a convex curved portion 56. The convex portion is contacted by the rollers 38 when the rollers are placed in the retainer. In the figure, the broken lines represent the position of the parts of the retainer before the roller is inserted in the retainer and the solid lines indicate the positions of the parts of the retainer after the shaft has been installed in the clutch assembly of retainers, roller, and outer case. The relative positions of the parts are exaggerated in the figures for purposes of clarity.

Figure 5:
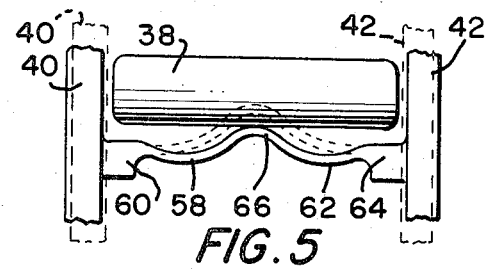
FIG. 5 is a fragmentary view of a further modification.

As shown in FIG. 5, the concave portion 58 is connected directly to a stop member or lug 60 which extends axially inwardly from rim 40. Concave portion 62 is connected directly to lug 64 extending axially inwardly from 42. The convex portion 66 interconnecting the convex portions is contacted by the rolling member 38.

The stop lugs 60 and 64 prevent the roller 38 from being pushed so far back in the clutch during the overrunning condition that the spring bar would be damaged. Normally, the roller will be stopped by the stop portion 36 of the cam space (see FIG. 1) before it could damage the spring. However, for some operations, it is desirable to use the stop lugs 60 and 64.

Figure 6:
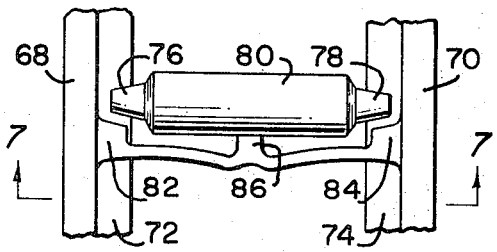
FIG. 6 is a fragmentary view of a further modification.
Figure 7:
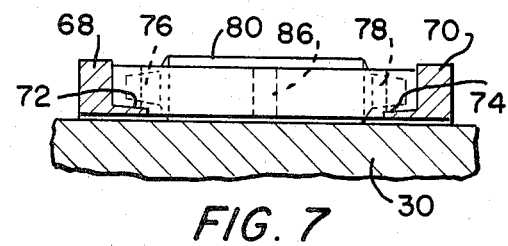
FIG. 7 is a sectional view taken along lines 7—7 of FIG. 6.
Figure 8:
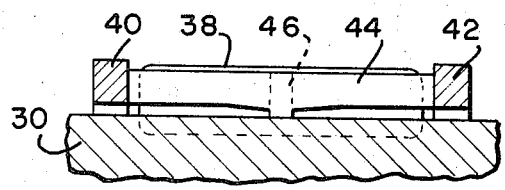
FIG. 8 is a sectional view taken along lines 8—8 of FIG. 3.

Our retainer may be made of resilient metal folded into shape or resilient plastic or rubber molded into shape. The end rims, for example, of some plastic retainers will have axially inward turned areas in the inner diameter of the end rims to support trunnion end rollers in the outer case and prevent the rollers from dropping out of the assembly of case-retainer-rollers before the shaft is installed. Thus, the assembly could easily be shipped and handled. Such a cage is shown in FIG. 6 and FIG. 7 wherein the longitudinally spaced end rims 68 and 70 include axially inwardly turned portions 72 and 74 respectively. The inwardly turned portions 72 and 74 retain the trunnions 76 and 78 respectively on the roller 80. The stop members or lugs 82 and 84 extend axially inwardly from rims 68 and 70, respectively. The roller contacting member 86 bears against the circumference of trunnion roller 80 and urges it circumferentially forward.

In the embodiments of FIG. 9, FIG. 10, and FIG. 12, there is less axial motion of the end rims 40 and 42 because the spring bars themselves flex partially axially when the roller loads the spring. As shown in FIG. 9, the spring bar comprises first portions 88 and 90 extending substantially perpendicularly axially from rims 40 and 42, respectively; second portions 92 and 94 extend circumferentially rearward at an angle from first portions 88 and 90, respectively. Third portions 96 and 98 each entend from the ends of the second portions 92 and 94, respectively. The substantially, rectangularly cross-sectioned roller-contacting member 100 extends circumferentially forward from portions 96 and 98 of the spring bar and contacts the roller 38 to resiliently bias the rollers.

The embodiment shown in FIG. 10 has a spring bar of the same general shape as the embodiment shown in FIG. 9. However, in the embodiment shown in FIG. 10, the first portions 88 and 90, instead of being connected directly to the rims, extend axially from stop lugs 102 and 104, respectively, which extend inwardly axially from rims 40 and 42 respectively.

In the embodiment shown in FIG. 12, a spring bar similar to the embodiments shown in FIG. 9 and FIG. 10 is shown. However, the embodiment shown in FIG. 12 differs from the embodiments shown in FIG. 9 and FIG. 10 in that the roller contacting portion includes a U-shaped portion 106 instead of a substantially rectangular cross-section portion. This shape gives greater flexibility to the spring bar than does the shape 100 of FIG. 10.

FIG. 11 shows a spring bar member which includes sides 108 and 110 to which the roller contacting member 100 is attached. When the roller 38 is inserted in the retainer and these are assembled into the outer case and the shaft or inner race is installed therethrough, the portions 108 and 110 are flexed circumferentially, as shown in FIG. 11. The stop members or lugs 112 and 114 are circumferentially spaced from the resilient spring bar and extend axially inwardly from rims 40 and 42, respectively. In the embodiment shown in FIG. 13, the portions 116 and 118 connected to rims 40 and 42, respectively, extend substantially perpendicularly to the rims 40 and 42 before the insertion of bearing member 38. When the shaft or inner race is inserted into the clutch assembly, portions 116 and 118 are curved circumferentially rearward.

FIG. 14 shows a spring bar cage having a shape similar to the spring bar of FIG. 4 except that the spring bar shown in FIG. 14 is used with a retainer for trunnion rollers 80.

The embodiment of FIG. 15 also shows a retainer adapted to be used with trunnion rollers with a spring bar similar to that shown in FIGS. 1 through 3.

FIGS. 16 through 20 show modifications of our invention which are made from thin metal strips. In FIG. 16, an overrunning clutch is shown with an inner shaft 120 and an outer case 122. The cam surface is on the shaft 120 and includes ramps 124 and stops 126. The longitudinal ends of the resilient spring bars 128 are connected to radially extending, substantially U-shaped portions 130 formed in each rim, one of the rims 132 being shown in FIG. 16. The U-shaped portion 130 extends radially, a sufficient distance so that the base of the U engages the cam surface of the shaft 120 and bears against the stop portion 126 of the cam surface to prevent relative rotation of the retainer. As in the other embodiments, the spring bars 128 resiliently urge the rollers 38 circumferentially up the ramps 124.

The embodiment shown in FIGS. 17 through 19 includes a shaft 30 similar to the shaft of FIG. 1 and the outer casing 32 with the cam surface including the ramp 34 and stop 36 on the inside surface of the outer casing 32. The retainer is constructed to retain trunnion rollers 80 and includes longitudinally spaced rims 140 and 142. Axially, inwardly projecting portions 144 and 146 extend from rims 140 and 142, respectively, and retain the trunnion-end rollers in the clutch assembly. The resilient spring bar member includes diagonal portions 147 and 148 extending forwardly from rims 140 and 142, respectively, and a trunnion contacting U-shaped portion 150. Portions 147 and 148 are connected to radially extending U-shaped portions 152 and 153, respectively, formed in rim 144 and 146 respectively. The U-shaped portions extend radially a sufficient distance so that the base of the U-shaped portion engages the stop portions 36 to prevent relative rotation of the retainer.

In the embodiment shown in FIG. 20, the U-shaped portions 154 and 156 on rims 158 and 160, respectively, do not extend radially from the rims a sufficient distance to engage the cam surface on the outer casing. For this purpose, tabs 162 and 164 are provided on the outside of the rims 158 and 160, respectively, and extend radially from the rims a sufficient distance to engage the stop portion on the outer casing to prevent rotation of the retainer.

In the embodiment shown in FIGS. 21 and 22, a roller retention pad 170 having a chamfered portion 172 extends from the rear of bar 44 to help retain the rollers 38 in the clutch assembly.

In operation, the retainers of the embodiments shown and described are made from plastic, thin strips of metal, or rubber. The spring bars extending between the rims provide a roller retaining function, a spring biasing function, and an end rim connecting function. When the rollers are inserted in the retainer and assembled into the outer case, and the shaft or inner race is installed; the spring bars are flexed circumferentially and thereafter exert a spring bias against the rollers urging the rollers upwardly on the ramps, which may be formed on the inner shaft or the outer casing.

A particularly important feature of this invention is that it is not absolutely necessary to keep the unit symmetrical; that is, one spring bar could act on three rollers, and one bar could act on four rollers in a nine cam clutch with the other two spaces occupied by the spring bars. Alternatively, the same nine cam clutch might have three spring bars symmetrically spaced, each acting on two rollers. Also, in the twelve cam clutch as hown in FIG. 1, there are three spring bars, one spring bar acting against one roller, a second spring bar acting against two rollers, and a third spring bar acting against six rollers. Alternatively, this clutch might use one spring bar activating eleven rollers or two spring bars symmetrically or unsymmetrically activating ten rollers, three spring bars symmetrically activating nine rollers, four spring bars symmetrically or unsymmetrically activating eight rollers, and six spring bars symmetrically activating six rollers with one bar per roller.

The spring bar retainer may equally well be used in clutch cases where the cams are so spaced that one roller will not and cannot activate a second roller when pushed by the spring bar and each roller must have its own spring bar.

While we have illustrated and spoken of rollers as the rolling members, the rolling members can equally well be balls.

We claim:

1. A retainer for an overrunning clutch having an outer member and an inner member of less outside diameter than the inside diameter of the outer member with one of said members having a cam surface and rolling members in the space between the outer member and the inner member comprising:
   a pair of longitudinally spaced rims;
   and at least one resilient spring bar member directly interconnecting the rims, said resilient spring bar member having a portion adapted to be engaged by a rolling member when the retainer and rolling members are assembled in the outer member with the inner member installed to flex said spring bar member circumferentially thereby causing a spring bias to be exerted against the rolling members and the spaced rims to move axially.

2. A retainer in accordance with claim 1 wherein: the resilient spring bar member is arcuately shaped in a circumferential direction and comprises a rolling member contacting member extending circumferentially fowardly from the resilient member, said rolling member contacting member adapted to be contacted by a rolling member and to bias the rolling members.

3. A retainer in accordance with claim 2 wherein: a rolling member stop member extends axially from each rim toward the other rim, said stop members being positioned to limit the circumferential movement of the rolling members.

4. A retainer in accordance with claim 2 wherein the rolling member contacting member is substantially rectangular in cross section.

5. A retainer in accordance with claim 1 wherein each rim has axially inwardly projecting portions to support trunnion end rollers.

6. A retainer in accordance with claim 1 wherein a roller retention pad extends from the rear of said resilient spring bar member.

7. A retainer in accordance with claim 1 wherein the resilient spring bar member comprises:
   a concavely curved portion extending from each rim with said concavely curved portions being interconnected by a convexly curved portion which contacts the rollers placed in the retainer.

8. A retaining member in accordance with claim 1 wherein the resilient spring bar member comprises:
   first portions extending perpendicularly axially from each rim, second portions extending circumferentially at an angle from said first portions, third portions extending from the ends of the second portions and in an opposite direction circumferentially from the direction of the second portions, and a rolling member contacting mid-portion interconnecting said third portions.

9. A retainer in accordance with claim 8 wherein the roller contacting mid-portion is substantially rectangular in cross section..

10. A retainer in accordance with claim 8 wherein the roller contacting portion is substantially U-shaped.

11. A retainer in accordance with claim 1 wherein: the rims and the resilient spring bar member are made from a sheet metal strip, and the longitudinal ends of the resilient spring bar member are connected to radially extending substantially U-shaped portions formed in each rim.

12. A retainer in accordance with claim 11 wherein: the U-shaped portions of each rim extending radially a sufficient distance so that the base of the U-shaped portion is adapted to engage a backstop surface of the cammed member to thereby prevent relative rotation of the retainer.

13. A retainer in accordance with claim 11 wherein: tabs extend radially from each rim and are adapted to engage a backstop surface of the cammed member to thereby prevent relative rotation of the retainer.

14. A retainer in accordance with claim 12 wherein: each U-shaped portion is an inverted U-shaped portion with its base adapted to engage a backstop surface formed on the outside member of an overrunning clutch.

15. A retainer in accordance with claim 12 wherein the base of each U-shaped portion is adapted to engage a backstop surface formed on the inside member of an overrunning clutch.

16. A retainer for an overrunning clutch in accordance with Claim 1 wherein the spring bar member comprises:
at least one rolling member stop extending axially from each rim toward the other rim;
and a resilient spring bar directly interconnecting the rolling member stops.

17. A retainer in accordance with claim 16 wherein the rolling member contacting portion is substantially rectangular in cross section.

18. A retainer in accordance with claim 16 wherein the resilient spring bar comprises:
a concavely curved portion extending from each stop with said concavely curved portions being interconnected by a convexly curved portion which contacts the rollers placed in the retainer.

19. A retainer in accordance with claim 16 wherein the resilient spring bar comprises:
first portions extending perpendicularly axially from each stop, second portions extending circumferentially at an angle from said first portions, third portions extending from the ends of the second portions and in an opposite direction circumferentially from the direction of the second portions, and a rolling member contacting mid-portion interconnecting said third portions.

* * * * *